March 5, 1968  R. A. HAWLEY  3,371,690
FILLING DEVICE FOR MEAT LOAF MOLDS
Filed June 21, 1965  2 Sheets-Sheet 1

INVENTOR.
Richard A. Hawley
BY
Webster & Webster
ATTORNEYS

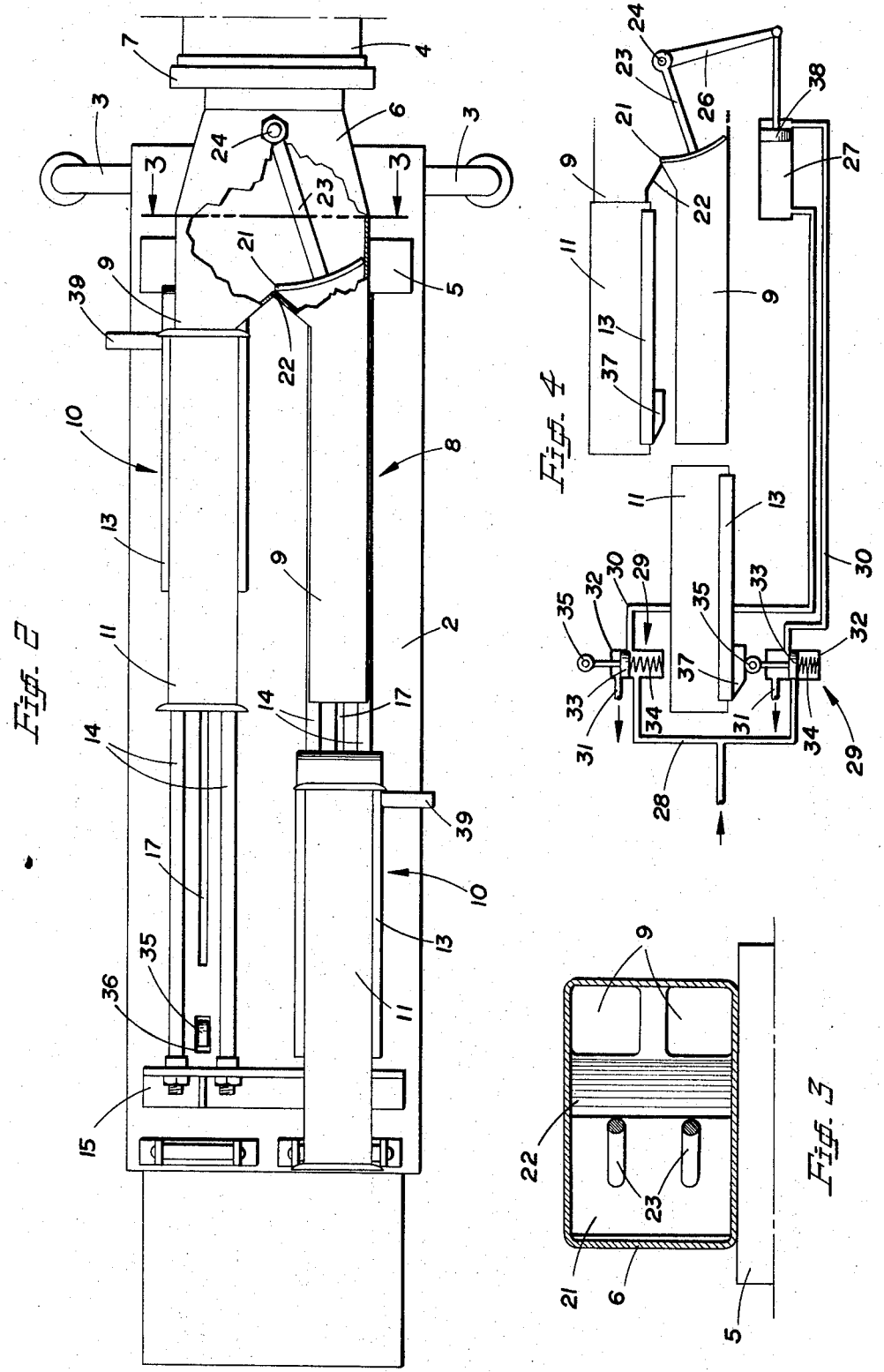

United States Patent Office 3,371,690
Patented Mar. 5, 1968

3,371,690
FILLING DEVICE FOR MEAT LOAF MOLDS
Richard A. Hawley, 2440 Scout Road,
Oakland, Calif. 94611
Filed June 21, 1965, Ser. No. 465,326
3 Claims. (Cl. 141—99)

ABSTRACT OF THE DISCLOSURE

A filling device, for meat loaf molds, which includes two pairs of horns adapted in alternation to receive a dual mold unit thereon for filling with meat loaf material pressure-fed through the corresponding pair of horns; there being means provided in the device to assure that only the pair of horns having a dual mold unit thereon will be supplied with meat loaf material under pressure.

---

Heretofore it has been the practice to fill dual meat loaf mold units on a device operative to receive and fill only one such mold unit at a time; a device of such character being shown in United States Patent No. 2,726,024.

In order to increase meat loaf production, without the necessity of merely duplicating individual devices, it is the major object of the present invention to provide a novel, unitary device adapted to receive, support, and fill a pair of dual meat loaf mold units; the mold units of such pair being alternately filled. This permits one mold unit to be readily positioned on the device while the other mold unit is being filled; all to the end that the device functions smoothly and rapidly, with a mold-filling operation always in progress.

Another important object of the invention is to provide the device with a feed control mechanism operative to automatically cause feeding of the meat loaf material alternately to the mold units; the feeding to each mold unit being initiated only upon completion of filling of the other mold unit.

An additional important object of the invention is to provide a device, as in the preceding paragraph, which embodies a dual stuffing horn unit for reception of each dual mold unit; said mechanism including a valve to control the delivery of meat loaf material into the horn units alternately, and such valve being operative—without manual attention and in response to each mold unit moving to a retracted, filled position—to switch the feed of the meat loaf material to the horn unit on which the other mold unit is then in an advanced position for filling.

A further object of the invention is to provide a meat loaf filling device which is designed for ease and economy of manufacture, and convenience of use.

A still further object of the invention is to provide a practical, reliable, and durable meat loaf filling device and one which is exceedingly effective for the purpose for which it is designed.

These objects are accomplished by means of such structure and relative arrangement of parts as will fully appear by a perusal of the following specification and claims.

In the drawings:

FIG. 2 is a top plan view of the device, partly broken out and in section, showing the mold units in the same positions as shown in FIG. 1.

FIG. 3 is a fragmentary enlarged cross section on line 3—3 of FIG. 1.

FIG. 4 is a diagram of the air control system for the valve shifting cylinder.

Figure 1:
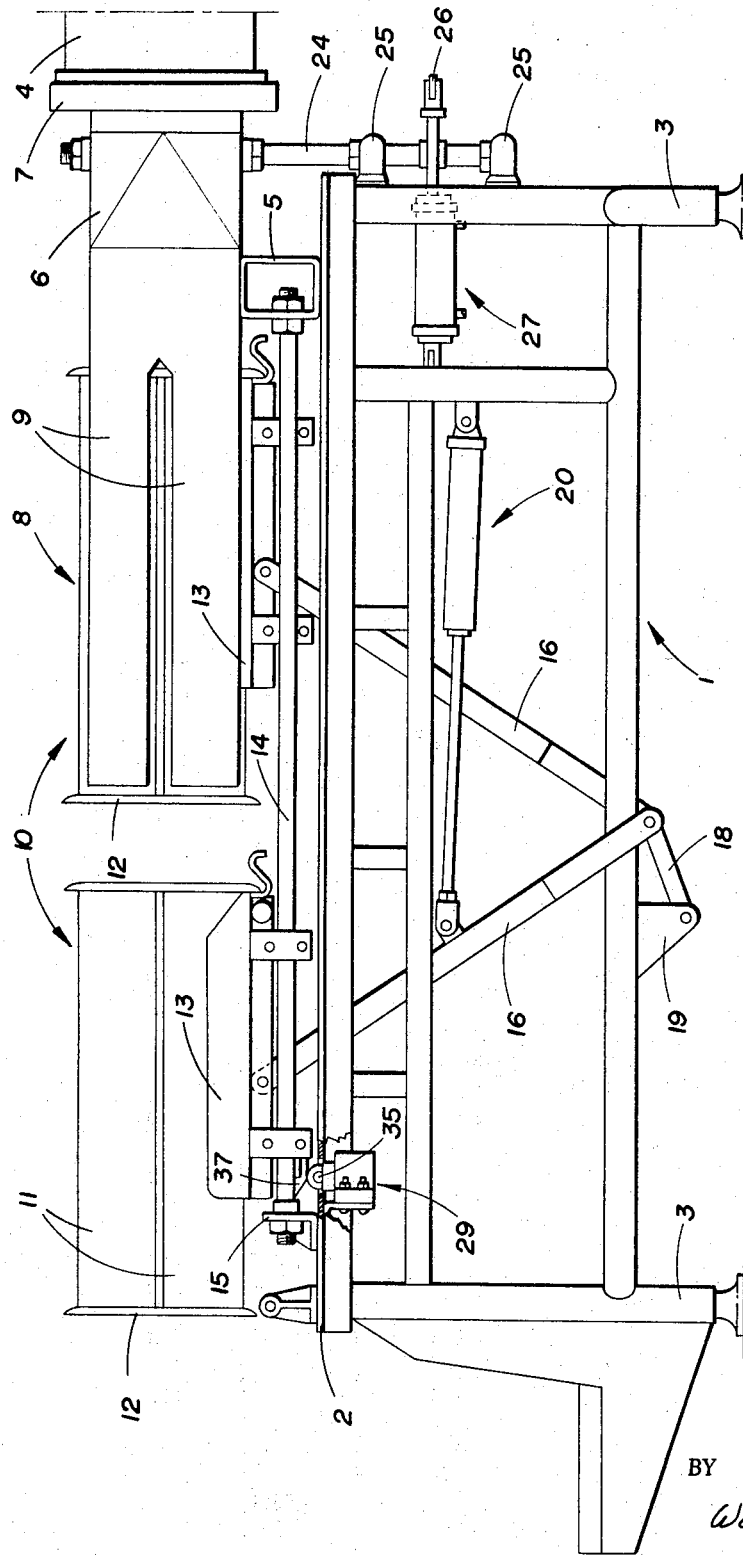
FIG. 1 is a side elevation of the meat loaf mold filling device with one of the mold units in advanced position for filling, while the other mold unit is in retracted, filled position.

Referring now more particularly to the drawings and to the characters of reference marked thereon, the device comprises an upstanding longitudinal frame, indicated generally at 1, surmounted by a horizontal table 2; the frame including supporting legs 3. Disposed a short distance back from the rear end of the frame 1 is a conventional pressure type, meat loaf material loader (not shown) from the forward end of which a tubular outlet 4 extends; said outlet 4 being horizontal and at a level a relatively short distance above the plane of the table 2.

Mounted on the table 2 adjacent its rear end is a cross beam 5 which supports a combined gate valve chamber and throat 6; such throat being circular at its rear end and at such end being alined with and detachably connected to the outlet 4 by a screw coupling 7.

Projecting forwardly from and integral with the throat 6—and, of course, open to the same—is a transversely spaced pair of dual stuffing tube or horn units 8. Each such unit 8 comprises a pair of longitudinally extending, vertically spaced rigid horns 9 of rectangular form in cross section and of a length and size to slidably fit for substantially their full length into a dual mold unit 10; the latter comprising a pair of vertically spaced, horn-receiving molds 11 rigidly connected by bottom end plates 12.

Each dual mold unit 10 is removably supported—horizontally—on a carriage 13 which is slidable on transversely spaced rod-like rails 14 for guided movement lengthwise of the horn units 8. These rails 14 are secured to and extend forwardly from the cross beam 5 to supporting brackets 15 on the table 2 adjacent its forward end. The full length of the rails 14 is sufficient to enable a carriage-supported mold unit 10 to be advanced from a retracted position in front of and clear of the horns to a position completely engaging over the horns 9. There is a carriage and supporting rails for each mold unit; each carriage being independent of the other.

A depending arm 16 is pivoted at its upper end on each carriage 13 on the underside and intermediate the ends thereof and projects through a longitudinal slot 17 in the table 2. At its lower end, the arm 16 is connected to one end of a short link 18 which at its other end is pivoted on a bracket 19 mounted on the underside of frame 1. A hydraulic check or retarding cylinder unit 20 is connected at one end to the arm 16 intermediate its ends, and at the other end is connected to the frame 1. The cylinder unit 20 is substantially horizontal and is arranged so that it exerts a retarding action only on the forward movement of the arm upon retraction of the related carriage and supported mold unit 10 from the corresponding horn unit 8.

Mounted in the throat 6 adjacent the forward end thereof is a transversely swingable vertical gate valve 21. Such gate valve is of a size to extend the full height of the throat and half the width of said throat, or between one side wall of the throat and the central partition wall 22 therein and which separates the transverse spaced pairs of horn openings. The gate valve 21 thus closes off one horn unit 8 at a time, leaving the other one open for the pressure feeding of meat loaf material thereinto from the loader outlet 4.

The gate valve 21 is mounted on rearwardly projecting arms 23 which at their rear ends are secured to an upstanding shaft 24 which is turnably mounted in the throat 6 adjacent its rear end and centrally thereof.

The shaft 24, which depends some distance below the throat 6, is journaled at its lower portion in connection with the frame 1, as shown at 25. Adjacent its lower end, the shaft 24 is provided with a radial arm 26 which is connected at its outer end to one end of an air actuated, power cylinder unit 27 which at its other end is swivelly anchored to the frame 1. The stroke of the power cylinder unit 27 (which is double acting) is such that upon air under pressure being applied to one end or the other of the cylinder, the gate 21 will be swung from one horn unit shutoff position or the other, respectively.

The power cylinder unit 27 (and consequently the gate valve 21) is actuated in the proper relationship to the movement of the mold units 10 onto and off the respective horn units 8 by means of the control system now to be described, and which is shown diagrammatically in FIG. 4.

An air pressure supply conduit 28 leads to separate identical control valves 29 arranged in parallel, and which are mounted on and under the table 2 below and in alinement with the positions occupied by the carriages 13 when in a retracted position. Each valve 29 has a conduit 30 leading therefrom; the conduit 30 of one valve 29 leading to one end of the power cylinder unit 27 while the conduit 30 of the other valve 29 leads to the other end of said cylinder unit. Each valve 29 also has an exhaust conduit 31 leading therefrom.

Each valve 29, in the specific form here shown, comprises a vertically disposed cylindrical casing 32 to which the various conduits are connected in vertically spaced relation, a valve piston 33 slidable in the casing, a spring 34 below and urging the piston upwardly, and a roller 35 or the like connected to the piston and disposed above the casing 32 and the table 2; the roller 35 projecting through an opening 36 in said table.

The piston 33 and the various conduits are arranged relative to each other so that when the piston is fully depressed against the resistance of the spring 34, the piston will close off the conduit 28 and place the conduits 30 and 31 in communication with each other. This enables the air under pressure and as previously supplied to the cylinder unit 27 to escape from the corresponding end thereof.

When the piston 33 rises to its top limit under the influence of the spring 34, the exhaust conduit 31 is closed off, and the conduits 28 and 30 are placed in communication with each other, allowing air to feed under pressure to the corresponding end of the cylinder unit 27.

Each carriage 13 is provided underneath—in transverse alinement with the corresponding valve 29 and its roller 35—with a cam 37 arranged to engage and depress such roller whereby the valve piston 33 is depressed to its air-exhausting position as previously described; this occurring, however, only when said carriage moves to its fully retracted position with the supported mold unit 10 clear of the corresponding horn unit 8.

When the cam 37 is clear of the roller 35, the valve piston 33 rises of itself to admit air to the related end of the cylinder unit 27 as previously explained.

The piston 38 of the power cylinder unit 27 is arranged relative to the gate valve 21 (to which it is operatively connected) in such a manner that when one of the carriages 13 and the mold unit 10 thereon is advanced so that said mold unit is moved over the related horn unit 8, the air under pressure then being fed to the cylinder unit 27 from the corresponding valve 29 will cause the piston 38 to move in a direction to swing the gate valve 21 to open said one horn unit to the meat loaf material feed from throat 6, and to close the other horn unit.

The carriages 13 are intended to be manually advanced in alternate order and are, therefore, provided on their outer sides with lateraly projecting handle bars 39; each such handle bar being adapted for grasping engagement by a corresponding operator positioned on the same side of the device.

Retraction of each carriage 13 is effected by the forward pressure of the meat loaf material from the horn unit acting against the bottom of the carriage-supported mold unit.

At the start of each cycle of operation of the device, one mold unit supporting carriage is in a retracted position while the other is advanced; said one carriage thus holding the corresponding valve piston 33 depressed and in an air-exhausting position. If said one carriage should be inadvertently advanced before the other carriage is retracted, and the corresponding valve 29 opens to feed air to the cylinder unit 27, no change in the position of the gate valve 21 will occur. This is because the air will be feeding to said cylinder unit 27 on both sides of the piston 38 and—as the air pressures will counteract each other—no movement of the piston (or the gate valve 21) will take place. However, when said one carriage is advanced and said other carriage is retracted, the valve 29 (corresponding to the latter) is moved to the exhaust position by the related cam 37, and the air pressure in the cylinder unit 27 on the opposite side of the piston 38 becomes effective to move the piston to the other end of said cylinder unit. This causes the gate valve 21 to be automatically swung to shut off the feed to the horn unit corresponding to the retracted carriage and at the same time to open the feed to the horn unit corresponding to the advanced carriage.

From the foregoing, it will be apparent that the carriage-supported dual mold units 10—with automatic switching of the gate valve 21—are filled alternately; one mold unit filling and, together with its supporting carriage, moving in a direction progressively retracting from the related horn unit, while at the same time the operator on the other side of the device removes a filled mold unit from the adjacent fully retracted carriage, replaces an empty mold unit on such carriage, and then manually advances said adjacent carriage and the empty mold unit thereon until the latter encompasses the corresponding horn unit and before the feed therefrom begins. This operation is repetitive in alternation with respect to the mold supporting carriages 13.

The one-way retarding cylinder units 20 function to assure of complete filling—with controlled loaf density—of the mold units, while offering no interference to the rapid and easy movement by an operator of an empty, carriage-supported mold unit to an advanced position for filling.

From the foregoing description, it will be readily seen that there has been produced such a meat loaf mold filling device as substantially fulfills the objects of the invention, as set forth herein.

While this specification sets forth in detail the present and preferred construction of the meat loaf mold filling device, still in practice such deviations from such detail may be resorted to as do not form a departure from the spirit of the invention, as defined by the appended claims.

Having thus described the invention, the following is claimed as new and useful and upon which Letters Patent is desired:

1. In a filling device for meat loaf molds, a throat receiving meat loaf material under pressure, a pair of spaced horns projecting from and open to the throat, a valve in the throat movable to alternately close the horns against feed of meat loaf material thereinto, molds mounted for alternate movement onto and off the horns, and control means for said valve functioning upon such alternate movement of the molds; a separate mold-supporting carriage movable lengthwise of each horn between an advanced position and a retracted position relative thereto; the valve control means comprising a power cylinder unit to so move the valve, said power cylinder unit including a cylinder having a piston therein, the latter being connected to the valve, air conduits connected to the cylinder on opposite sides of the piston, separate valves in the conduits, each of said separate valves including a movable valve member which in one position allows air under pressure to flow to the related end of the cylinder and when in another position allows air to exhaust from said end of the cylinder, means acting on said valve members to yieldably move the same to said one position, an exposed control element projecting from each valve member in a predetermined position relative to the path of a corresponding carriage, and means on each carriage arranged to engage the related control element and to move the same and its valve member to said other position when said carriage reaches a fully retracted position.

2. In a filling device for meat loaf molds, a throat receiving meat loaf material under pressure, a pair of spaced feed of meat loaf material thereinto, molds mounted for alternate movement onto and off the horns, and control horns projecting from and open to the throat, a valve in the throat movable to alternately close the horns against means for said valve functioning upon such alternate movement of the molds; a separate mold-supporting carriage movable lengthwise of each horn between an advanced position and a retracted position relative thereto; the valve control means comprising a power cylinder unit to so move the valve, said power cylinder unit including a cylinder having a piston therein, the latter being connected to the valve, air conduits connected to the cylinder on opposite sides of the piston, separate valves in the conduits, each of said separate valves having a movable control element which when in a normal raised position allows a flow of air under pressure to pass to the cylinder and when in a lowered position allows air to exhaust from the cylinder, means yieldably maintaining each control element in said raised position, and a cam on each carriage arranged and positioned relative to a corresponding one of said separate valves to engage and lower the related control element only upon such carriage reaching a fully retracted position relative to the corresponding horn, the piston then moving to swing the valve in the throat in a direction to close off the feed to such horn.

3. In a filling device for meat loaf molds, and which devices includes, with a mold, a horn through which meat loaf material is fed under pressure to the outer end of said horn; a mold supporting carriage movable lengthwise of the horn to advance the mold onto said horn for filling and to permit retracting movement of such mold from the horn under the pressure of the meat loaf material feeding from the latter, and means acting on the carriage to retard only such retracting movement of the mold; said means comprising an arm depending from the carriage, means pivoting the arm at its upper end on the carriage and at its lower end in a relatively fixed position, and a one-way retarding cylinder unit connected at one end to the arm intermediate the ends thereof and mounted at the other end in a fixed position.

References Cited
UNITED STATES PATENTS

| | | | |
|---|---|---|---|
| 380,185 | 3/1888 | Chase | 141—283 |
| 723,072 | 3/1903 | Thom | 141—283 |
| 2,064,213 | 12/1936 | McJoynt | 141—67 |
| 2,160,285 | 5/1939 | Routh | 141—283 |
| 2,635,799 | 4/1953 | Hoy | 141—283 |
| 2,805,444 | 9/1957 | Hensen et al. | 17—39 |
| 3,108,318 | 10/1963 | Miller et al. | 17—35 |
| 2,280,022 | 4/1942 | Banigan et al. | |

LAVERNE D. GEIGER, *Primary Examiner.*

H. S. BELL, *Assistant Examiner.*